United States Patent
Nguyen et al.

(10) Patent No.: US 7,496,706 B2
(45) Date of Patent: Feb. 24, 2009

(54) MESSAGE SIGNALED INTERRUPT REDIRECTION TABLE

(75) Inventors: Tom L. Nguyen, Auburn, WA (US); Steven R. Carbonari, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 10/882,922

(22) Filed: Jun. 30, 2004

(65) Prior Publication Data

US 2006/0015668 A1    Jan. 19, 2006

(51) Int. Cl.
    *G06F 13/24*    (2006.01)
    *G06F 13/32*    (2006.01)
(52) U.S. Cl. ................................... 710/269
(58) Field of Classification Search ............... 710/260, 710/269, 263, 15; 703/25
    See application file for complete search history.

(56) References Cited

U.S. PATENT DOCUMENTS

| | | | | | |
|---|---|---|---|---|---|
| 5,410,709 | A | * | 4/1995 | Yu | 710/269 |
| 5,675,807 | A | * | 10/1997 | Iswandhi et al. | 710/260 |
| 5,857,090 | A | * | 1/1999 | Davis et al. | 703/25 |
| 5,892,957 | A | * | 4/1999 | Normoyle et al. | 710/263 |
| 6,370,598 | B1 | * | 4/2002 | Martwick | 710/15 |
| 6,374,321 | B2 | * | 4/2002 | Pawlowski et al. | 710/260 |
| 6,401,153 | B2 | * | 6/2002 | Pawlowski | 710/260 |
| 6,618,770 | B2 | | 9/2003 | Nayyar et al. | |
| 6,711,643 | B2 | * | 3/2004 | Park et al. | 710/260 |
| 7,089,341 | B2 | * | 8/2006 | Kriegel | 710/266 |
| 2001/0032284 | A1 | * | 10/2001 | Pawlowski | 710/260 |
| 2005/0060462 | A1 | * | 3/2005 | Ota | 710/260 |
| 2005/0228922 | A1 | * | 10/2005 | Tsao et al. | 710/268 |

OTHER PUBLICATIONS

PCI Local Bus Specification, Revision 3.0, Feb. 3, 2004, pp. 1-6, 15-17, 231-253.
PCI Express Base Specification Revision 1.0, Jul. 22, 2002, pp. 1-8 and 259-262.
PCI Local Bus Specification Revision 2.3, MSI-X ECN, pp. 1-23.
Intel 460GX Chipset Datasheet, Jun. 2001, pp. i-v, 1-1-1-3, 2-15-2-22, and 7-1-7-7.

* cited by examiner

*Primary Examiner*—Thomas Lee
*Assistant Examiner*—Mohammed H Rehman
(74) *Attorney, Agent, or Firm*—Alan K. Aldous

(57) ABSTRACT

In some embodiments, the inventions include a chip having a message signaled interrupt redirection table (MRT) that contains entries including an address field and a data field. The chip also includes translation circuitry to translate an address field and a data field of a message signaled interrupt (MSI) signal by copying contents of the address field and data field of an entry in the MRT into the address field and data field of the MSI. Other embodiments are described and claimed.

13 Claims, 7 Drawing Sheets

MESSAGE SIGNALED INTERRUPT REDIRECTION TABLE

BACKGROUND

1. Technical Field

The present inventions relate to circuitry to a message signaled interrupt redirection table (MRT) and to related systems.

2. Background Art

Message signaled interrupts (MSI) are a feature that enables a device function to request service by writing a system-specified data value to a system-specified address using, for example, a PCI (Peripheral Components Interconnect) DWORD (double word) memory write transaction. MSI is optional for PCI through PCI Local Bus Specification Rev 3.0, Feb. 3, 2004, but is used in PCI Express Specifications and is included in PCI-X specifications. MSI is an interrupt-generation mechanism that enables a PCI device to send an inbound memory write on its PCI bus to the front side bus (FSB), bypassing an IOxAPIC (input output advance programmable interrupt controller).

MSI-X is an enhancement to MSI. MSI and MSI-X are described in PCI Local Bus Specification, Rev. 3.0, section 6.8, pp. 231-253. MSI and MSI-X each allow a device to have multiple interrupt vectors. In MSI and MSI-X, a vector includes address and data. In MSI, the vector addresses must be contiguous. Due to the lack of support of simultaneous multi-processing (SMP) affinity in the MSI capability structure and operating systems' (OS's) non-contiguous vector scheme, OS's do not allow more than one interrupt vector per device. Consequently, Microsoft Windows and Linux OS's assign vectors contiguously as each device is encountered and limit the initial allocation to one vector per device. If the OS were to assign multiple contiguous MSI vectors per device during initialization, it may run out of interrupt vectors before all devices have been assigned interrupt vectors causing the system boot to fail. In MSI-X, the vectors do not have to be contiguous.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

In the process of enabling MSI for PCI Express, the inventors noticed the following constraints which impose limitations on the MSI implementation in PCI Express:

(a) The current OS MSI implementation in PCI/PCI Express is unable to enable multiple messages for MSI capable PCI device/PCI Express endpoints, which implements MSI capability structure.

(b) The current MSI implementation in PCI Express does not include software support of rebalancing interrupt priority to improve system performance.

(c) The current MSI implementation allows corrupted vectors to be transmitted to the processor before being detected.

To provide a solution for the above constraints, the inventors propose an MSI redirection table (MRT) which would be incorporated into a chipset Northbridge infrastructure. With the addition of MRT in the Northbridge and an operating system (OS) MRT driver, which manage all inbound messages generated from PCI/PCI-X/PCI Express end point devices, the following advantages can be realized in some embodiments of the invention:

(a) Replace legacy IOxAPIC with MRT in native PCI Express system.

(b) Provide the OS kernel in the runtime with controls of (1) rebalance interrupt priority transparent to PCI/PCI-X/PCI Express devices and (2) handling invalid MSI vectors before they are routed to the front side bus (FSB).

Figure 1:
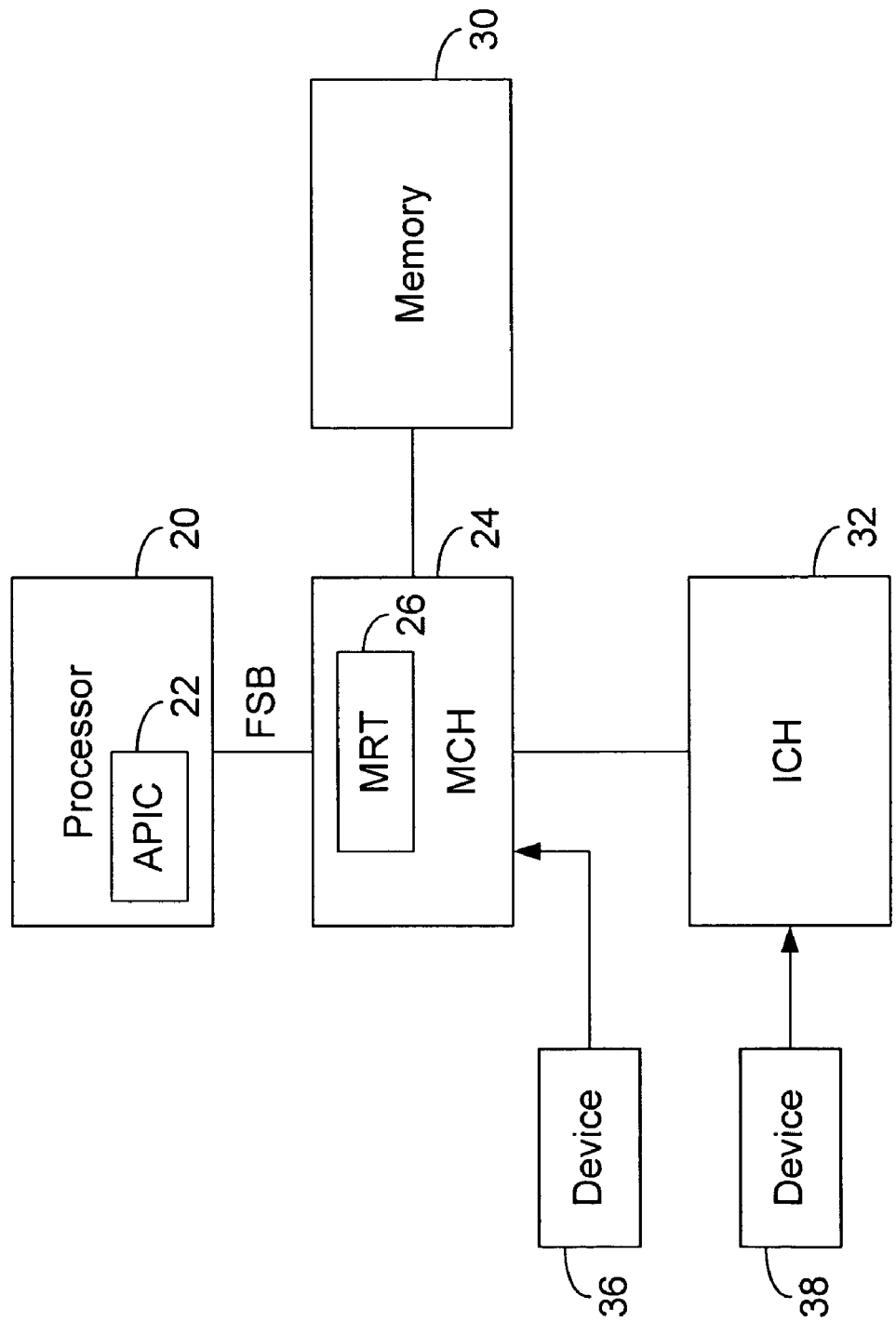
FIG. 1 is a schematic block diagram representation of a uni-processor system according some embodiments of the inventions.

In some embodiments, MRT is implemented in the North Bridge, such as an MCH, and has 256 entries (or more to support multiple processors), which has a 32-bit size (DWORD), as illustrated in FIG. 1. Each entry of MRT contains MSI address and data attributes necessary for the North Bridge to perform any required MSI translation. The valid bit in each entry indicates whether requested MSI should be translated.

Figure 5:
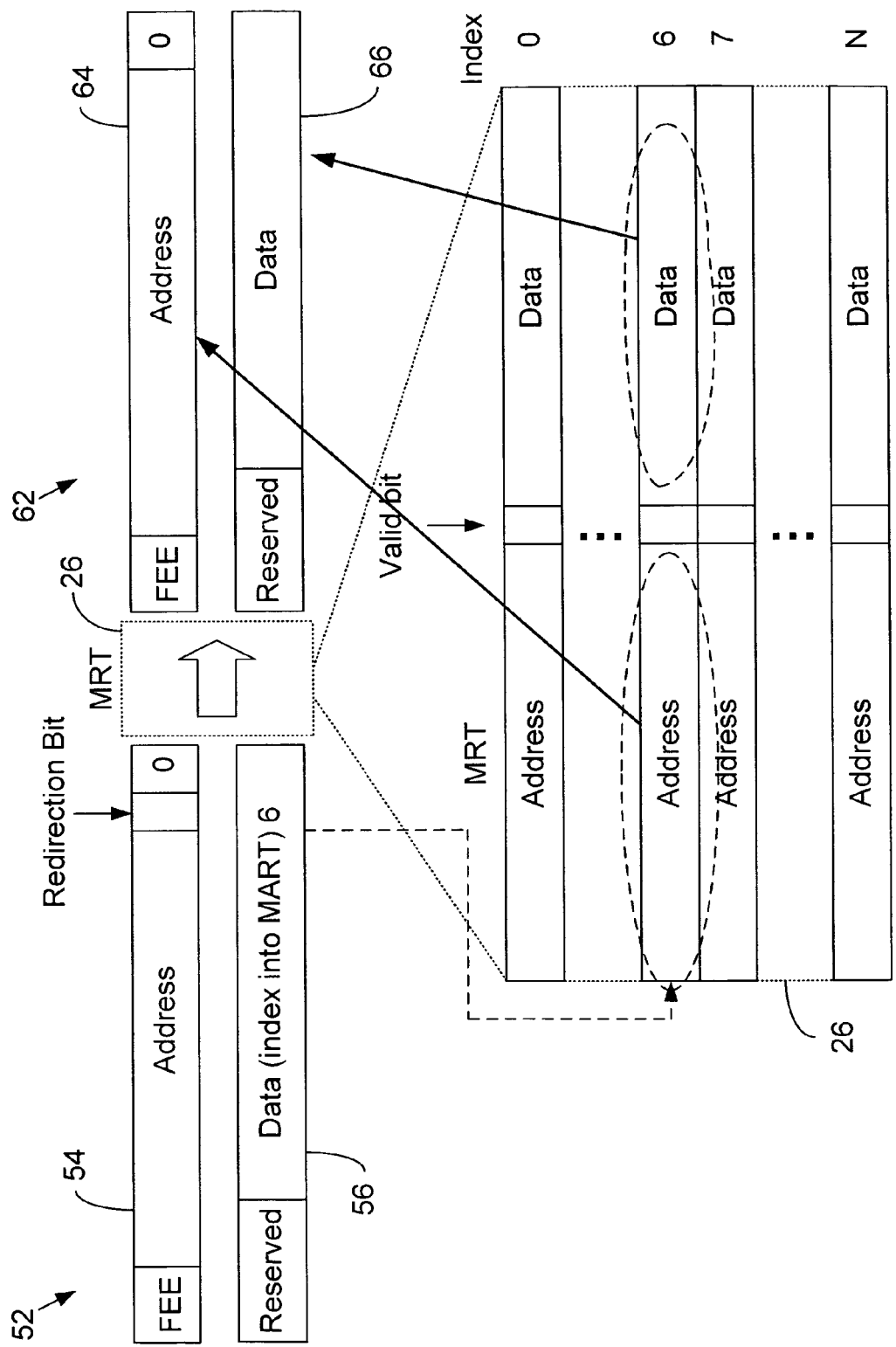
FIG. 5 is a graphical representation of a MRT translation of address and data information according to some embodiments of the inventions.

Inbound MSIs pass through an MCH (or similar circuitry) before directed to the FSB. Depending on whether the redirection bit in each message address is set, the MRT will determine whether to translate the message address/data accordingly. If the message address has a redirection bit set and the vector stored in the message data has a valid entry in MRT, MRT will perform required translation before directing this message address/data to the FSB, as illustrated in FIG. 5.

The MRT software driver, which is part of the OS kernel, initializes MRT with valid entries. Each entry corresponds to a unique MSI allocated to each PCI/PCI-X/PCI-Express device function. The unique message is in term of virtual vector or real vector depending on the redirection bit in the message and the valid bit in its associated MRT entry.

In some embodiments, if both the redirection bit in the message and the valid bit in its associated MRT entry are set, then MRT will use the message data as an index into the MRT to find the true associated entry. MRT then replaces the address and data of the message with the corresponding fields in the MRT entry. The translation is transparent to the device function and its software driver.

Prior to this invention, the OS had no efficient way to rebalance MSI priority dynamically. The MRT provides the OS kernel with a mechanism to dynamically control the rebalancing of MSI interrupt priorities. This allows fine tuning of interrupt performance and increased system bandwidth based on the OS application needs and easily support multiple MSI's per device. The following are advantages that are provided by some embodiments, but which are not required for all embodiments:

(a) A single central memory space table managed by the OS kernel will eliminate the use of memory space MSI-X table in MSI-X device function. This advantage enables the OS kernel to support native PCI-Express devices, which implement MSI-X support.

(b) Provide a mechanism that allows the OS to enable multiple MSIs without violating the contiguous requirements of the MSI capability structure.

(c) All native PCI-Express device functions are required to implement MSI capability structure to support MSI. Optionally, PCI Express devices may also implement MSI-X. The use of MRT will enable designers to design and implement "native PCI-Express MSI-X device functions" with OS support for multiple vectors for both MSI and MSI-X.

(d) Provide OS kernel runtime with controls of (a) rebalancing interrupt priority transparent to PCI, PCI-X or PCI Express devices and (b) handling invalid MSI vectors before they are routed to the FSB.

FIG. 1 illustrates an example of a system in which a MRT may reside according to some embodiments of the inventions. However, the systems of the inventions are not restricted to the details of FIG. 1. Referring to FIG. 1, a system includes a processor 20 (also called a CPU) coupled to a memory controller hub (MCH) 24 through a front side bus (FSB). Processor 20 is shown including an advanced programming interrupt controller (APIC) 22, although that is not required in all embodiments. MCH 24 includes a MRT 26. Main memory 30 and an input/output controller hub (ICH) 32 are also coupled to MCH 24. Device 36 is coupled to MCH 24 and device 38 is coupled to ICH 32. Device 36 may provide interrupt requests to MCH 24, which passes the interrupt requests through the FSB to processor 20. Device 38 may provide interrupt requests to ICH 32, which passes the interrupt requests to MCH 24, which in turn passes the interrupt requests through the FSB to processor 20. In a typical computer system, there would be several additional devices and other chips, not illustrated in FIG. 2. The MCH is sometimes called a Northbridge and the ICH is sometimes called a Southbridge, although some people make a technical distinction between them. As used herein, the terms MCH, ICH, Northbridge and Southbridge are intended to be interpreted broadly to cover various chips who functions include passing interrupt signals toward a processor.

Although the term APIC is used herein, the invention has applicability to processors that include other sorts of internal interrupt controllers.

Figure 2:
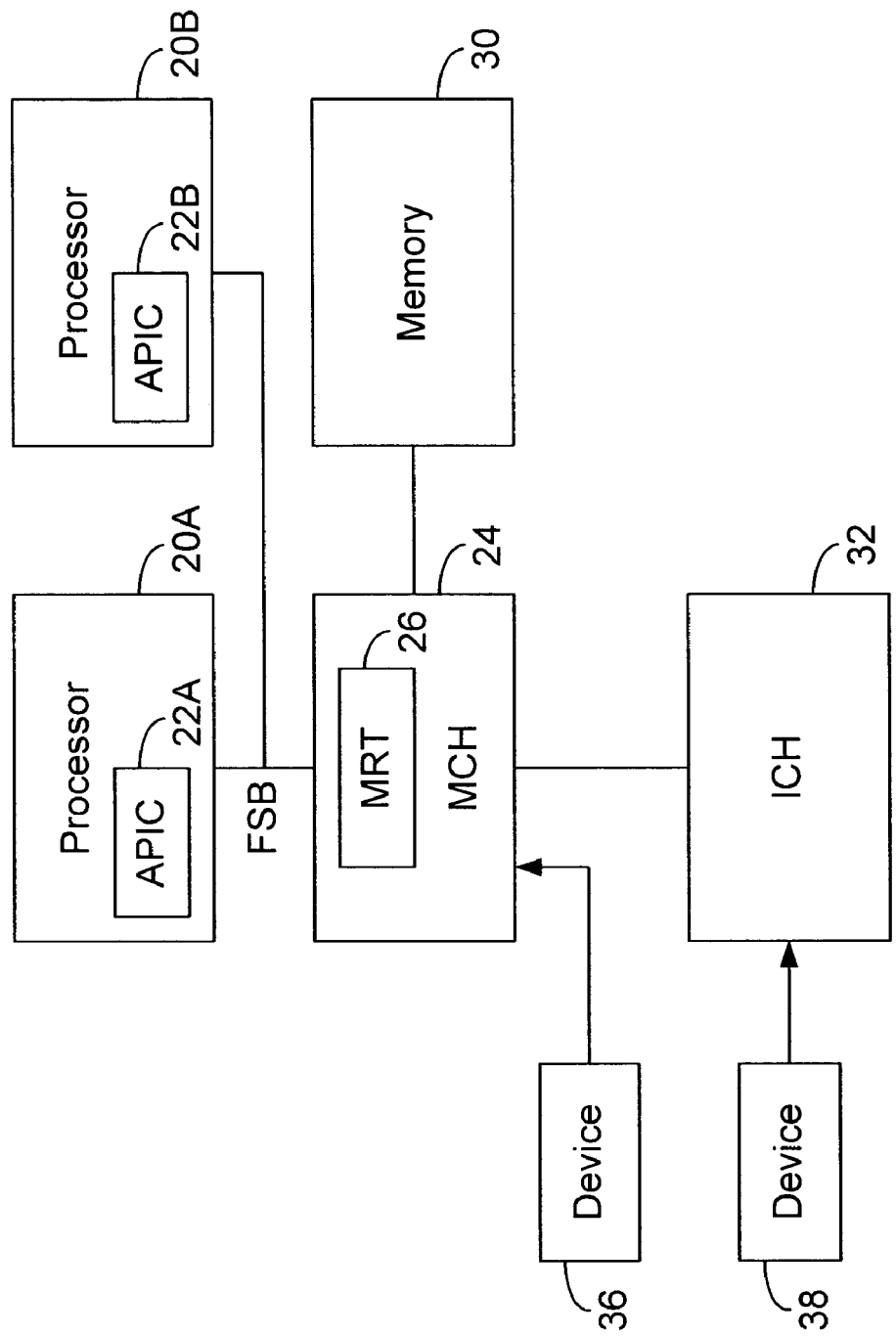
FIG. 2 is a schematic block diagram representation of a multi-processor system according some embodiments of the inventions.

FIG. 2 illustrates a system like that of FIG. 1 except that it is a multiple processor system including processors 20A and 20B, with APICs 22A and 22B. MCH 24 in FIG. 2 may be the same as or different than in FIG. 1. For example, the MCH in FIG. 1 may be designed to be used in both a uni-processor and a multi-processor system. Alternatively, different types of MCHs might be used for a uni-processor system and a multi-processor system. The FSB may be a multi-drop or point-to-point interconnect in FIG. 2. The term FSB is intended to cover various types of interconnects to the processor(s).

Figure 3:
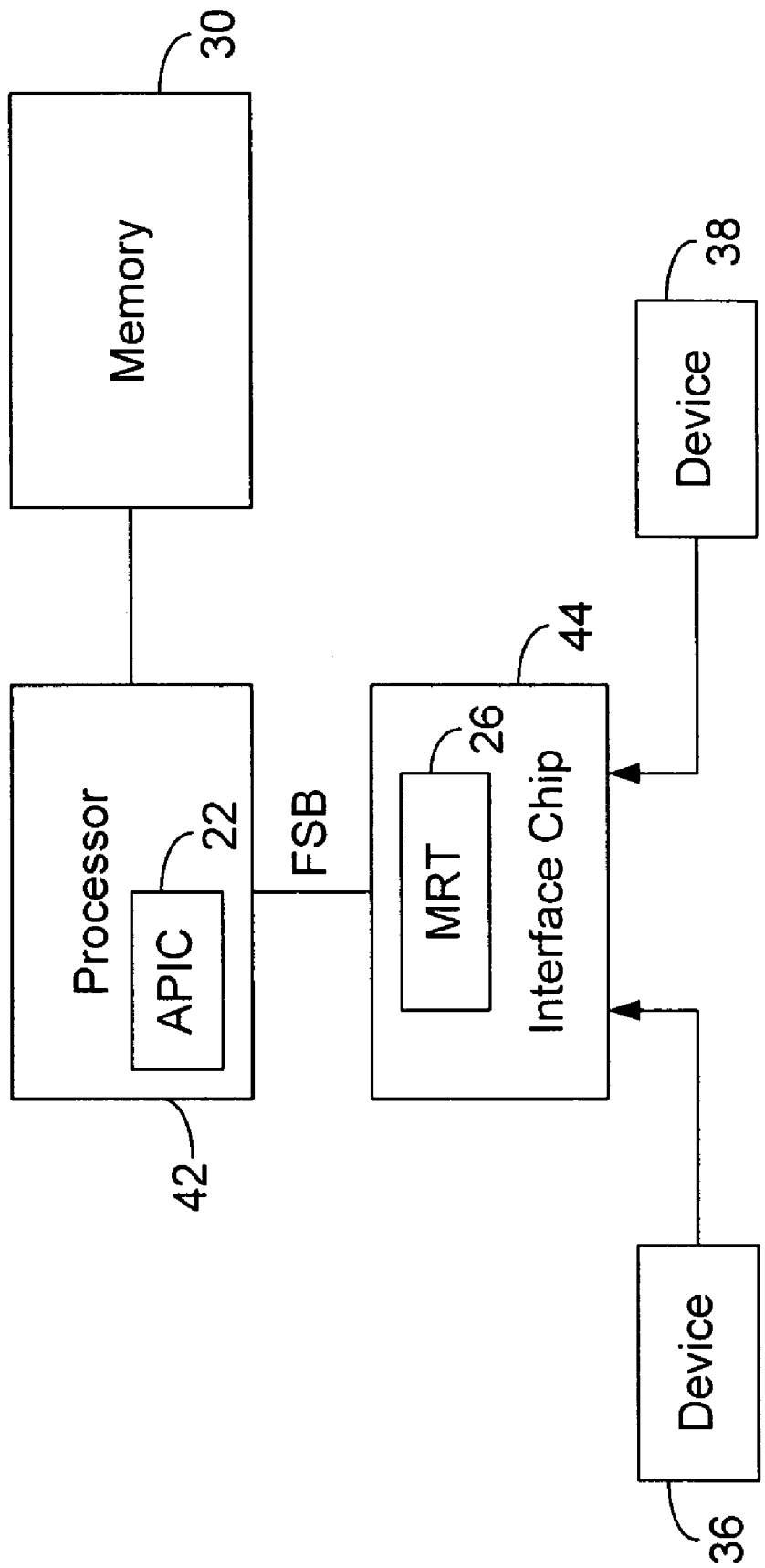
FIG. 3 is a schematic block diagram representation of system according some embodiments of the inventions.

In FIGS. 1 and 2, the memory controller (not specifically identified) is in MCH 24. In FIG. 3, by contrast, the memory controller is a processor 42. In this case, there is not an MCH, but rather there is an interface chip 44 between device 36 and processor 42. Interface chip 44 performs some functions of the MCH and ICH. In FIG. 3, APIC 22 and MRT 26 may be somewhat different than in FIGS. 1 and 2. Note that in typical computer systems, there are other chips in the system not illustrated in FIG. 1, 2, or 3.

Figure 4:
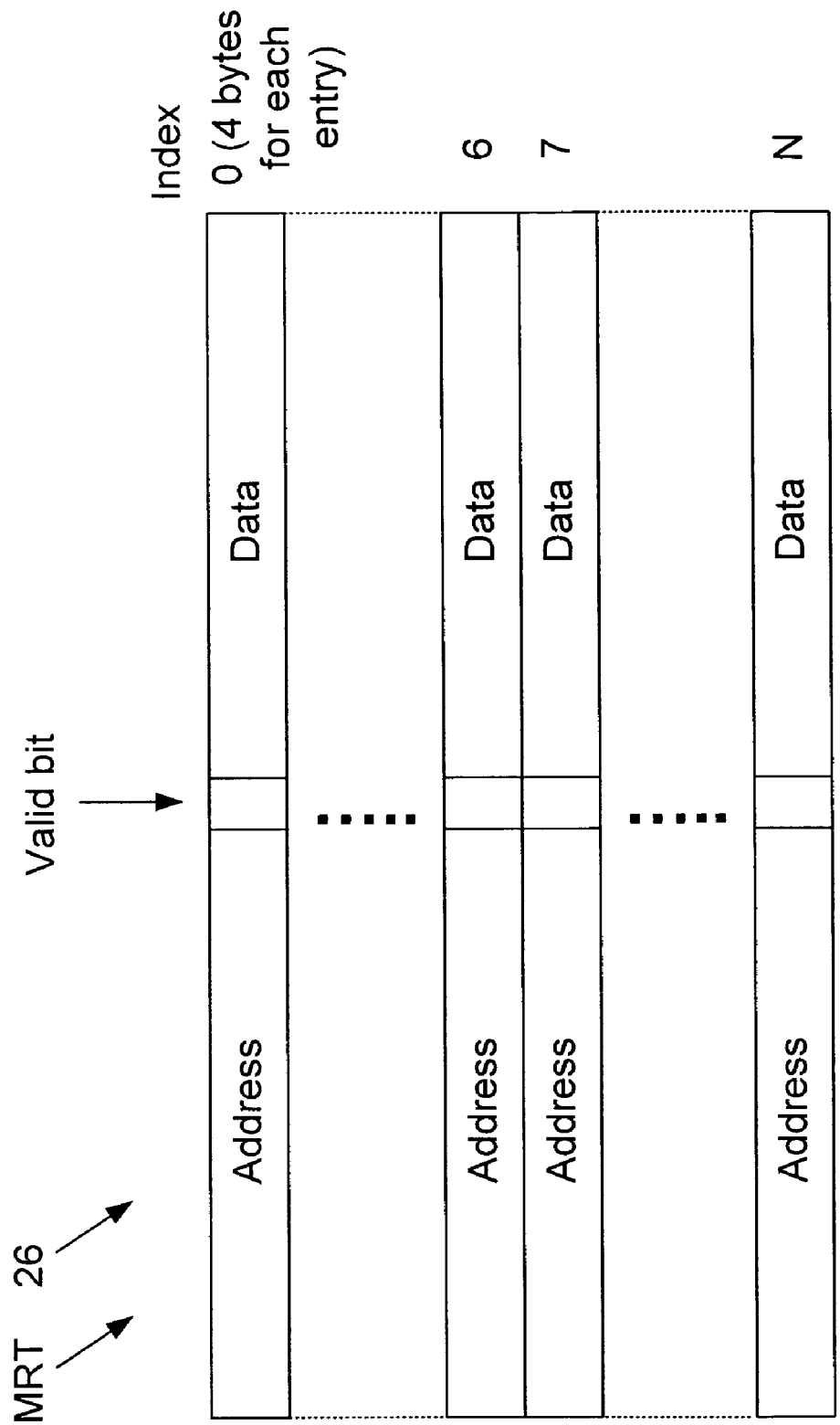
FIG. 4 is a graphical representation of a MRT according to some embodiments of the inventions.

FIG. 4 illustrates a MRT 26 according to some embodiments of the inventions, although the inventions are not restricted to the details of FIG. 4. In FIG. 4, MRT 26 includes N rows designated by an index number 0 . . . N. In the case of Linux, N is 255. This could correspond to 256 interrupts. In Microsoft Windows, there may be 256 interrupt vectors per CPU. Of course, operating systems (OS's) could be notified to handle more than 256 interrupts. In the example of FIG. 4, each row (entry) includes 4 bytes, but this is not required. An address field includes the address part of the vector and a data field includes the data part of the vector. A valid bit indicates whether the row in MRT is considered valid. If the valid bit is not set, an error message may be generated.

The redirection bit indicates whether the inbound MSI is to be translated through MRT 26 and then passed to the FSB, or passed directly to the FSB without translation. If the redirection bit is set (for example, a value "1"), the MSI is translated through MRT 26 and otherwise, it is passed directly to the FSB.

FIG. 5 illustrates a translation of an MSI through MRT 26. In FIG. 5, an inbound MSI 52 includes an address field 54, a data field 56, and a redirection bit. The MSI 62 after translation has an address field 64 and a data field 66. In this case, "FEE" is used by the processor to differentiate MSI memory writes from other memory writes (however, this is not required in all embodiments). An architecture dependent number of least significant bits of the address may be set to "0" to align the cache line and memory architecture of the system. Further, there may be a "reserved" field. In the example, "FEE" is a 12-bit hex value (bits[31:20]), which is reserved as FEEh.

In FIG. 5, the redirection bit is set and the MCH uses the message data 56 as an index into the corresponding entry of MRT 26. In the example of FIG. 5, the data field 56 includes an index to row 6 of MRT 26. The address and data fields in row 6 of MRT 26 are placed in address field 64 and data field 66 of MSI 62, which is the translated MSI.

In some embodiments, the data fields 56 and 66 include a physical interrupt vector, which is an index into the interrupt description table (IDT) located in CPU local APIC 22. The interrupt descriptor table of each local APIC 22 has, for example, 256 entries with each entry containing the address of an interrupt service handler. MRT translation of message address and message data is transparent to local APIC. The message address and message data being translated by MRT are directed to the local APIC (for example, APIC 22 in processor 20).

Figure 6:
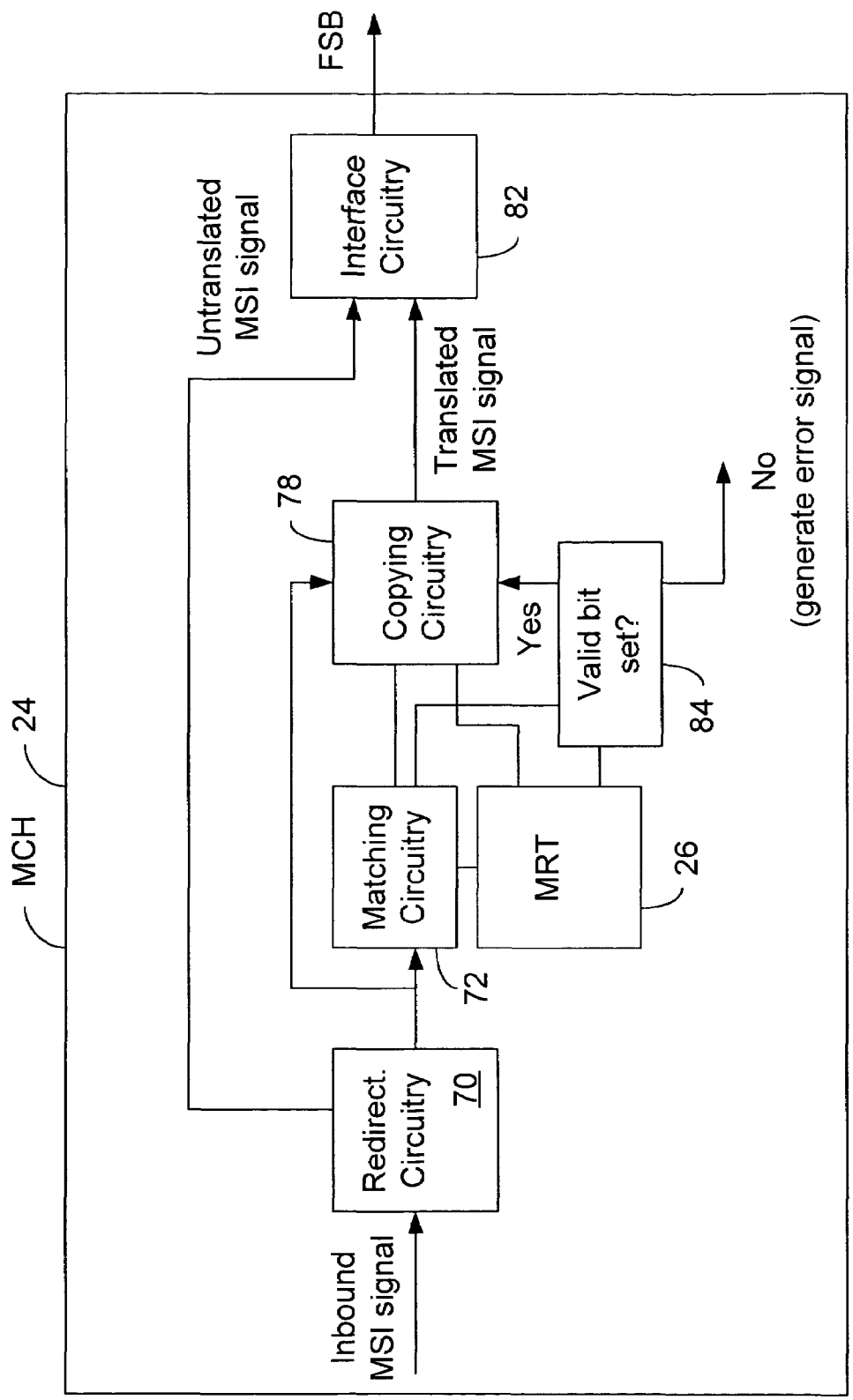
FIG. 6 is a schematic block diagram representation of details of a chip in FIG. 1 according some embodiments of the inventions.

There are many ways in which the translation through MRT 26 may be implemented. FIG. 6 illustrates an example, but the inventions are not restricted to the details of FIG. 6. Referring to FIG. 6, MCH 24 includes redirection circuitry 70 that receives the inbound MSI 52 and either passes it to MRT 26 or to interface circuitry 82 depending on the state of the redirection bit. MCH 24 includes translation circuitry including matching circuitry 72 and copying circuitry 78. Assuming the redirection bit is set to have the translation occur, matching circuitry 72 compares at least part of data field 56 with the index in MRT 26 to identify a row in MRT 26. (Row 6 in the case of FIG. 5). Once the row in MRT 26 is identified, circuitry 84 determines whether the row is valid. If the row is not valid, an error signal is generated either by circuitry 84 or by other circuitry. If the row is valid, circuitry 84 indicates this to copying circuitry 78 which copies the data and address contents of the row in MRT 26 into at least a portion of address field 64 and data field 66 of MSI 62. In some embodiments, the entire contents of the address and data fields of the row are inserted into address and data fields 64 and 66. In other embodiments, only a portion of the contents of the address and data fields of the row are copied into address and data fields 64 and 66. In some embodiments, the entire address and data fields of the MSI are replaced. In other embodiments, only a portion of the address and data fields of the MSI are replaced.

Of course, in practice, there would be additional circuitry in MCH 24 that is not illustrated in FIG. 6. There may be additional circuitry on the paths shown in FIG. 6 that are not illustrated in FIG. 6. In some embodiments, there is not valid bit in rows of MRT 26, so circuitry 84 is not used.

Figure 7:
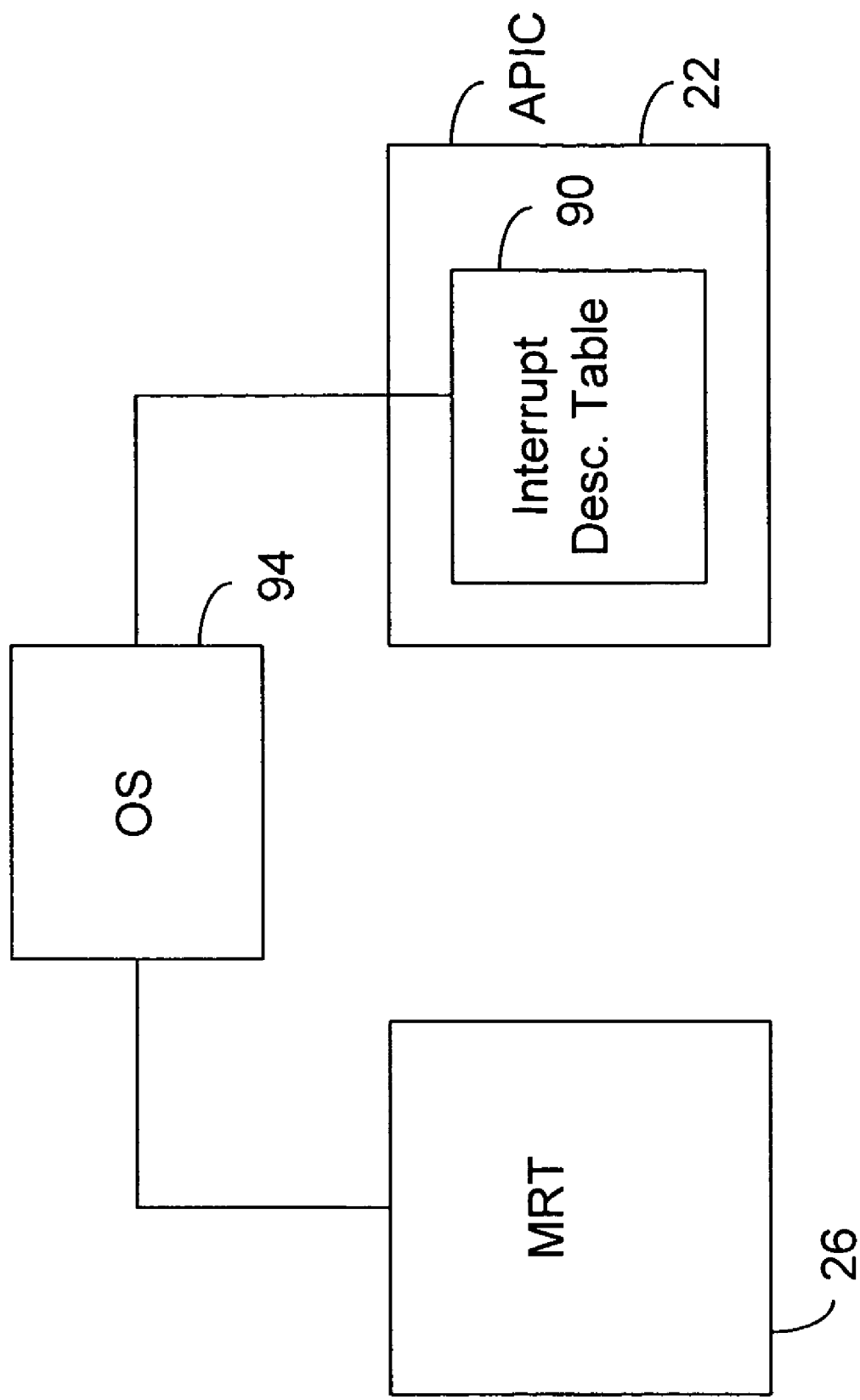
FIG. 7 is a schematic block diagram representation of a system according some embodiments of the inventions.

FIG. 7 illustrates a system in which an operating system (OS) 94 controls the contents of MART 26 and the interrupt descriptor table 90 in APIC 22 (also shown in FIG. 1).

The translation through MRT 26 allows a system including the MRT to do at least the following three things. Some systems do all three, while other systems do only one or two of them.

(1) The translation through MRT 26 allows incoming MSIs of contiguous vectors for a device to be translated to non-contiguous vectors.

(2) The translation through MRT 26 allows the OS to dynamically change the address in MRT 26 and thereby change the particular APIC the vector is assigned to allowing rebalancing of interrupts across multiple processes. This aspect applies to multi-processor systems and uni-processor systems with more than one APIC.

(3) The translation through MRT 26 allows the OS to dynamically change interrupt priority through changing the data field in the MSI 62. The data field of MSI 62 includes an index into the interrupt descriptor table 90 in APIC 22 and that table is priority based. OS 94 might also change the priority represented in the interrupt descriptor table 90.

MRT 26 may include fields in addition to what is shown in FIG. 4. However, these details are implementation specific. Further, in actual implementations, the fields may be referred to be different names. For example, the address may be referred as a destination identification (ID) and extended ID (if extra address bits are needed). The data field may be referred to as a vector (not to be confused with the combination address and data vector described above). There may be a delivery mode field that indicates either fixed mode (interrupt message goes directly to a specified CPU) or lowest priority mode (message goes into the least busy CPU). There may be a destination mode field that indicates either physical mode or logical mode. In physical mode, the local APIC on the CPU is used. In the logical mode, the OS goes around the local APIC with a logical ID.

MSIs 52 and 62 may also include fields in addition to what is shown in FIG. 5, and the fields may have different names. Examples include those mentioned in connection with MRT 26 rows. There may also be a trigger field in the message data that indicates whether the inbound message 52 is level or edge triggered. Currently, an MSI is edge triggered. A delivery status field may also be included.

In some cases, it may turn out that the contents in the address and the data fields of MRT 26 are identical to the address and data fields in inbound MSI 52. In that case, the translation processor would not change the values in the address and data fields of the MSI.

MRT 26 includes both address and data fields for translation, and both the address field and data fields are potentially changed in the translation process. Alternatively, a MRT might include only address field or a MRT might include only a data field. In the translation in these cases, only the address field of the MSI would be changed or only the data field would be changed.

The logic described above is designed for particular values of high and low signals. However, the logic could be changed to respond to different values of high and low signals.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A chip comprising:
   interface circuitry to provide received untranslated message signal interrupt (MSI) signals and translated MSI signals, wherein the MSI includes a data value;
   a MSI redirection table (MRT) that includes entries having an address field and a data field;
   wherein the data field of the received untranslated MSI signal includes a physical interrupt vector, which is an index into a local advanced programmable interrupt controller interrupt description table;
   redirection circuitry to receive MSI signals each having an address field, a data field, and a redirection field, and wherein if the redirection field for particular ones of the MSI signals has a first value, the redirection circuitry passes those MSI signals to the interface circuitry as the untranslated MSI signals and if the redirection field for particular ones of the MSI signals has a second value, the redirection circuitry passes those MSI signals to translation circuitry, wherein the MSI signal translation circuitry includes:
   matching circuitry to identify entries in the MRT based on at least part of the data field of the MSI signals to be translated, wherein the at least part of the data field acts as an index to the MRT; and
   copying circuitry to create the translated MSI signals by copying at least a portion of data and address contents of valid identified entries into at least a portion of the address and data fields of the MSI signals to be translated, and to provide the translated MSI signals to the interface circuitry.

2. The chip of claim 1, wherein MRT entries includes a valid field to indicate whether the entries are valid.

3. The chip of claim 1, wherein the redirection field includes a bit and the first value is a first voltage for the bit and the second value is a second voltage for the bit.

4. The chip of claim 1, wherein the translation allows incoming MSIs to have contiguous vectors for a device and wherein the translation translates them to non-contiguous vectors.

5. The chip of claim 1, wherein at least some of the address fields of the MRT are dynamically changeable by an operating system.

6. The chip of claim 1, wherein the contents copied by the copying circuitry is less than the entire address field and data field of the MSI signals.

7. A system comprising:
a processor including an interrupt controller;
memory to include an operating system which is used by the processor;
a chip including:
interface circuitry to provide received untranslated message signal interrupt (MSI) signals and translated MSI signals, wherein the MSI includes a data value;
a MSI redirection table (MRT) that includes entries having an address field and a data field;
wherein the data field of the received untranslated MSI signal includes a physical interrupt vector, which is an index into an interrupt description table of the interrupt controller;
redirection circuitry to receive MSI signals each having an address field, a data field, and a redirection field, and wherein if the redirection field for particular ones of the MSI signals has a first value, the redirection circuitry passes those MSI signals to the interface circuitry as the untranslated MSI signals and if the redirection field for particular ones of the MSI signals has a second value, the redirection circuitry passes those MSI signals to translation circuitry, wherein the MSI signal translation circuitry includes:

matching circuitry to identify entries in the MRT based on at least part of the data field of the MSI signals to be translated, wherein the at least part of the data field acts as an index to the MRT; and
copying circuitry to create the translated MSI signals by copying at least a portion of data and address contents of valid identified entries into at least a portion of the address and data fields of the MSI signals to be translated, and to provide the translated MSI signals to the interface circuitry.

8. The system of claim 7, wherein MRT entries includes a valid field to indicate whether the entries are valid.

9. The system of claim 7, wherein the redirection field includes a bit and the first value is a first voltage for the bit and the second value is a second voltage for the bit.

10. The system of claim 7, wherein the translation allows incoming MSIs to have contiguous vectors for a device and wherein the translation translates them to non-contiguous vectors.

11. The system of claim 7, wherein at least some of the address fields of the MRT are dynamically changeable by the operating system.

12. The system of claim 7, wherein the contents copied by the copying circuitry is less than the entire address field and data field of the MSI signals.

13. The system of claim 7, wherein there is an additional processor and the operating system dynamically changes contents of at least some of the address fields of the MRT to rebalancing interrupts of corresponding the MSIs across the processors.

* * * * *